United States Patent [19]

Lee et al.

[11] Patent Number: 4,739,023

[45] Date of Patent: Apr. 19, 1988

[54] POLYMERIZATION OF VINYL CHLORIDE WITH A CLAY AND A HYDROPHILIC POLYMER SUSPENDING AGENT

[76] Inventors: Kyu W. Lee, No. 24-383 Doryongdon, Chung-Ku, Daejeon, Chung Nam; Sam K. Lim, 884 Chungdong Pucheon, Kyung g, both of Rep. of Korea

[21] Appl. No.: 914,412

[22] Filed: Oct. 2, 1986

[51] Int. Cl.$^4$ .................................................. C08F 2/20
[52] U.S. Cl. .................................... 526/194; 526/200; 526/201; 526/202
[58] Field of Search ........................................ 526/194

[56] References Cited

U.S. PATENT DOCUMENTS 3,383,346  5/1968  Smith ..................................... 260/23
3,468,828  9/1969  Perrins ................................. 260/23.7
3,899,473  8/1975  Johansson ........................ 260/92.8 W Primary Examiner—Christopher Henderson
Attorney, Agent, or Firm—Leonard Tachner

[57] ABSTRACT

There is disclosed a suspension polymerization of vinyl chloride in which the suspension of monomers as droplets is maintained, and the droplets of polymer are prevented from coalescence by the addition of an expanding lattice clay, preferably a magnesium alumina silicate clay, most preferably, Veegum, and a hydrophilic polymer. The hydrophilic polymer can be a partially hydrolized polyvinyl alcohol, a hydroxyalkyl cellulose ether, or a cross-linked polyacrylic acid, the latter being preferred. These addities enhance polymerization by reducing polymerization time and reducing deposition of the polymer in the reactor. Additionally, the shape and particle size distribution of the polymer is improved.

14 Claims, No Drawings

POLYMERIZATION OF VINYL CHLORIDE WITH A CLAY AND A HYDROPHILIC POLYMER SUSPENDING AGENT

BACKGROUND OF THE INVENTION

1. Field of Invention

This invention relates to a process for the suspension polymerization of vinyl chloride and, in particular, to such polymerization in which an hydrophilic polymer and a clay are used as suspending agents.

2. Brief Statement of the Prior Art

The majority of polyvinyl chloride is produced by suspension polymerization, which is a heterogeneous polymerization in which droplets of the vinyl chloride monomer are dispersed in an aqueous medium with an emulsifier and agitation. An emulsifier is desirable as it can also control the porosity of the resin product and prevent the formation of fish eyes in the product, in the manner described in U.S. Pat. No. 2,528,469. A polymerization initiator which liberates free radicals is dissolved in the monomer droplets. The suspension of the droplets is maintained by suspending agents and protective colloids. The polymerization is commonly activated by heat which releases free radicals from the initiator. Polymerization proceeds in the monomer droplets which are dispersed through the aqueous phase and, during polymerization, collisions of the droplets tend to cause coalescence of the polymer phase. The mechanical agitation establishes a dynamic equilibrium between droplet formation and coalescence. Emulsifiers are used in this suspension polymerization to stabilize the monomer droplets in the aqueous dispersion medium and to stabilize the polymer particles as they are formed and prevent their coalescence. In a typical polymerization system, the monomer droplets and polymer particles are surrounded by the emulsifier molecules which have a hydrophilic portion directed toward the dispersing aqueous phase.

As the polymerization proceeds, the viscosity of the polymerization system increases and it becomes more and more difficult to maintain dispersion of the polymer in droplets by agitation because of the viscous nature of the polymerization medium. The polymerization reaches a point where the emulsifiers, alone, cannot maintain the dispersion and cannot prevent coalescence of the polymer particles.

The tendency of the dispersion to coalesce affects the polymerization in several ways. It adversely affects the particle size distribution and shape of the polymer products. It also adversely affects the efficiency of the polymerization. When the dispersion coalesces, vinyl chloride polymer agglomerates on the interior surfaces of the reactor, including the surfaces of mixing baffles and the propellers of high speed agitation mixers. As this build up progresses, the agitation efficiency is severely affected, accelerating the coalescence of the polymer.

The polymerization is also exothermic and considerable heat is generated during the polymerization. It is common to provide indirect heat transfer with the polymerization medium to remove the heat of reaction. As the polymer droplets coalesce and coagulate, the polymer deposits on the reactor heat transfer surfaces. This reduces the efficiency of heat transfer, and adversely affects the temperature control of the process. This is an accelerating phenomenon, as the loss of temperature control results in loss of control of molecular weight and side reactions and increases the rate of deposition of the polymer on the heat transfer surfaces.

The depositing of polymer agglomerates inside the reactor also reduces the turn around time of the reaction system as the deposits must be cleaned from the reactor before it is recharged and returned to polymerization. Accordingly, it is desirable to minimize the clean out time of the polymerization reactors by minimizing the amount of polymer deposits which are formed on the reactor surfaces during the progress of the polymerization. Additionally, it is also desirable to decrease the amount of polymerization time as this too significantly affects the capacity of a polymerization plant.

Prior investigators have used protective colloids to stabilize the suspension against coalescence. Various hydrophilic polymers have been used as protective colloids in suspension polymerization of vinyl chloride. U.S. Pat. No. 3,205,204 suggests that water-soluble methyl cellulose can be used, and U.S. Pat. No. 4,360,651 suggests the use of cross-linked polyacrylic acid as suspending agents. An article reported in *Chem. Abstracts* 99: 3894u suggests that preferred suspending agents are polyvinyl alcohol, water-soluble gelatin and polyacrylic acid. Although hydrophilic polymers improve the polymerization somewhat, further improvements are desired.

BRIEF STATEMENT OF THE INVENTION

This invention comprises suspension polymerization of vinyl chloride wherein an expanding lattice clay is combined with a hydrophilic polymer as suspending agents. The preferred combination is a mixture of Veegum which is a complex colloidal magnesium aluminum silicate derived from naturally occurring smectite clays and a hydrophilic polymer such as polyacrylic acid, polyvinyl alcohol or water soluble cellulose ethers. It has been found that the presence of a slight amount of this combination in the polymerization zone significantly reduces surface fouling of the polymerization reactor and reduces the time required for polymerization. It is further noted that the complex enhances the stability of the droplets in the reactor, shifts the particle sizes toward a bell-shaped distribution pattern and provides a greater uniformity in the size of the polymer droplets.

DESCRIPTION OF PREFERRED EMBODIMENT

This invention is a method for the polymerization of vinyl chloride in a heterogeneous system, more specifically, in an aqueous suspension. As typical of suspension polymerization, the vinyl chloride is dispersed with the aid of an emulsifier and agitation into minute monomer droplets throughout the continuous water phase.

Free radical initiators are included in the system, and these are soluble in the vinyl chloride monomer phase, and the polymerization is initiated by the thermal decomposition of the initiator to form free radicals which initiate and propagate the polymerization. The amount of initiator which can be used can be from 0.01 to 2, preferably from 0.02 to 1.0, weight percent, based on the weight of the monomer in the polymerization reactor.

Any of a number of free radical precursors which are soluble in vinyl chloride can be used as initiators. Examples of suitable initiators are: dibenzoyl peroxide, dicumyl peroxide, 2,2-azo(bis)isobutylnitrile, 2,2-azobis(-dimethylvaleronitrile), diethyl peroxide, distearyl peroxide, t-butyl peroxide, di(2,4-dichlorobenzoyl)peroxide, diacetyl peroxide, t-butyl perbenzoate, t-amyl peroctoate, di(t-butyl peroxy)cyclohexane, di-(t-butyl)-peroxide, dicumyl peroxide, acetyl cyclohexyl sulfonyl peroxide, di(2-ethylhexyl)peroxydicarbonate, di(sec-butyl)peroxydicarbonate, diisopropyl peroxydicarbonate, t-butyl peroxypivalate, lauroyl peroxide, etc. Of the aforementioned, di(2-ethylhexyl)peroxydicarbonate is a preferred initiator.

The dispersion of the monomer into droplets and maintenance of the dispersion during polymerization is facilitated by the presence of a suitable emulsifying agent. The emulsifying agent which is selected can be a non-ionic, cationic or anionic surface active agent. Typical of non-ionic emulsifying agents are the various polyethylene condensates with fatty alcohols, acids, amides, amines, and polyol esters such as sorbitan fatty acid esters. Examples of these are Igepal, Triton, Atlas, and Tween surfactants. Another class of nonionic emulsifying agents are ethylene oxide adducts of acetylenic glycols which are sold commercially under the name Surfynols. Anionic emulsifying agents which can be used include compounds obtained by sulfonation of fatty derivatives, e.g. Tallosan, sulfonated and sulfated fatty acid esters of mono- and polyvalent alcohols which are marketed under the names Nopco, Sandozol, Stantex, etc. Anionic surfactants which can be used are the alkali metal and ammonium salts of fatty acids having from 12 to 18 carbons, e.g., sodium laurate, sodium stearate, etc. Cationic emulsifiers which are useful include polyethoxylated quaternary ammonium salts such as Ethoquad; Variquat; etc. The emulsifier is used at a concentration of from 0.01 to 2, preferably from 0.05 to 1 weight percent, based on the water phase in the polymerization reactor.

The polymerization medium is water and the vinyl chloride monomer is dispersed in the water with the aforementioned emulsifier and agitation. Typically, the vinyl chloride is used at concentrations from about 20 to about 50 percent of the polymerization medium. Use of lesser quantities of water hinders the heat transfer necessary to remove the heat of polymerization. The addition of greater quantities of water that aforementioned, however, greatly reduces the concentration of the product and makes recovery of the polymer more difficult and expensive.

The polymerization is initiated by heating of the polymerization medium to a sufficient temperature to decompose the initiator and form free radicals. Commonly the polymerization is conducted in the temperature range from 25° C. to 100° C., preferably from 30° to about 60° C. The temperature of the polymerization controls the molecular weight of the polymer. Although the polymerization rate increases with an increasing temperature, this also results in the production of low molecular weight resins. Accordingly, it is generally preferred to conduct the polymerization at the lowest temperature which will provide the desired rate of polymerization.

The polymerization is performed in closed, pressured reactors. The pressure can be from atmospheric to a pressure of 150 psig, depending on the temperatures employed. As an illustration, at initiation of the polymerization at 55° C., the pressure of the system is approximately 115 psig. This pressure will remain constant until the monomer is about 70 percent converted to polymer and thereafter the pressure declines as the polymerization proceeds.

The polymerization is performed in batch reactors with typical cycle times of about 16 hours of which approximately 13 hours is required for the polymerization reaction. Once the conversion reaches approximately 85 percent conversion the polymerization rate decreases substantially and the polymerization is commonly terminated once it has reached approximately 95 percent completion.

The combination of suspending agents which is used as a protective colloid in the aforementioned polymerization is an expanding lattice clay and a hydrophilic organic polymer.

The expanding lattice clays include montmorillonite, smectite, sucinite, vermiculite, nontronite, saponite, hectorite, etc., which have a three-layer crystal. These clays are commonly found in admixture in bentonite clays having an average aluminum oxide content less that about 20 percent. The bentonite clays also have a high ion exchange capacity commonly between about 50 and 150 milliequivalents per 100 grams of air-dried clay. Swelling or expanding lattice clays are found in Wyoming, South Dakota, Montana, Utah, Nevada and California.

The aforedescribed clays are usually found in a form wherein the ion exchange sites are occupied with alkali and/or alkaline earth metals. e.g., sodium, potassium, calcium, magnesium, etc. The clays can be used in this form and are usually washed, and ground to the desired degree of fineness.

Of the aforementioned expanding lattice clays, the preferred is veegum, which is a complex colloidal magnesium aluminum silicate derived from natural smectite clay. The chemical composition of veegum is as follows:

TABLE 1

| Ingredient | Content |
| --- | --- |
| silicon dioxide: | 56.9–69.0% |
| magnesium oxide: | 2.9–13.0% |
| aluminum oxide: | 8.9–17.0% |
| ferric oxide: | 0.7–1.8% |
| calcium oxide: | 1.1–2.0% |
| sodium oxide: | 2.1–3.8% |
| potassium oxide: | 0.2–1.0% |

The hydrophilic polymer which is used in combination with the aforementioned expanding lattice clay can be a cellulose ether such as carboxymethyl cellulose, hydroxyalkyl cellulose ethers such as hydroxymethyl cellulose, hydroxyethyl cellulose, which are obtained by reacting alkali cellulose with the appropriate halide sulfate or epoxide. Hydroxypropylmethyl cellulose which is obtained by including propylene oxide and methylchloride to react with alkali cellulose can also be used as well as hydroxybutylmethyl cellulose, which is obtained by including 1,2-butylene oxide with methyl chloride in the reaction with the alkali cellulose.

The hydrophilic polymer which is used with the clay can also be a hydrolyzed polyvinyl alcohol. Polyvinyl alcohol is prepared by the hydrolysis of polyvinyl acetate and the polymer can be varied by the degree of hydrolysis of the acetate groups. It is preferred to use only partially hydrolyzed polyvinyl alcohol, i.e., products having from 50 to 90 percent of the acetate groups hydrolyzed.

In addition to the aforementioned, a suitable hydrophilic polymer includes polyacrylic acid and its copolymers, cross linked polyacrylic acid and its copolymers with other monomers such as acrylamide, etc.

Polyacrylic acid is preferred, and cross-linked polyacrylic acid is most preferred as the suspending agent to be used in combination with the clay.

The aforementioned suspending agents can be incorporated in the polymerization reactor by separate additions, or alternatively, can be combined to form a complex or adduct prior to addition to the polymerization reactor. The complex can formed by mixing the aforementioned expanding lattice clay with the hydrophilic polymer in proportions of from about 9:1 to 1:9 weight parts of the hydrophilic polymer per weight parts of the clay. Regardless of whether a complex between the clay and hydrophilic polymer is preformed or in formed in situ by separate addition of the individual components, these suspending agents are blended in the aqueous continuous phase in the polymerization zone to produce a protective colloid that prevents coalescence of the polymer droplets during vinyl chloride polymerization.

The combination of the expanding lattice clay and hydrophilic polymer is included in the polymerization zone in an amount from about 0.01 to 1 weight percent based on the weight of the vinyl chloride monomer.

The following examples will serve to demonstrate the invention and illustrate the results obtainable thereby:

EXAMPLES

In the following experiments, the polymerization was conducted in 1-liter glassware reactors equipped with a stirring shaft on which were mounted three, standard four-bladed, vertically curved turbine impellers. The polymerization was conducted with the following procedure:
Deionized water and the hydrophilic polymer were charged to the reactor;
If used, the expanding lattice clay was added to the reactor;
A surfactant, Tween 80, was charged to the reactor;
The reactor was sealed and evacuated for 30 minutes;
Vinyl chloride monomer with the initiator, di-2-ethylhexylperoxydicarbonate, was charged to the reactor;
The reactor was agitated for 15 minutes at 500 rpm;
The reactor and contents were heated to 55° C. and maintained at that temperature thereafter;
The polymerization was continued until the pressure was observed to drop to 95 psig;
Thereafter, the polymerization reactor was rapidly cooled and vented;
The resin product was recovered from the reactor;
The reactor was rinsed with deionized water three times; and
The polymer on the surface of the reactor, agitator shaft and blades was removed and weighed to determine the total polymer buildup.

The length of elapsed time from when the reactor agitation was started until the pressure was observed to fall to 95 psig was observed in each run.

The polymer product was analyzed using standard ASTM testing to determine:
Size distribution, bulk density, plasticizer absorption, degree of polymerization, inherent viscosity and funnel flow time.

EXAMPLE 1

In the first experiment, the protective colloid which was used was cross-linked polyacrylic acid, and it was used with and without the expanding lattice clay, in successive experiments. Six runs were made in the test, each using the preceding procedure. The results are tabulated in the following table:

EXAMPLE I RESULTS
TABLE 2

|  | Test No. | | | | | |
| --- | --- | --- | --- | --- | --- | --- |
|  | 1 | 2 | 3 | 4 | 5 | 6 |
| Conditions | | | | | | |
| Vinyl chloride | 100 | 100 | 100 | 100 | 100 | 100 |
| Water | 200 | 200 | 200 | 200 | 200 | 200 |
| Carbopol | 0.13 | 0.13 | 0.1 | 0.1 | 0.22 | 0.22 |
| Veegum | 0.13 | 0 | 0.1 | 0 | 0.22 | 0 |
| Tween 80 | 0.05 | 0.05 | 0.05 | 0.05 | 0.05 | 0.05 |
| Di-2-ethyl hexyl peroxy dicarbonate (wt %) | 0.05 | 0.05 | 0.05 | 0.05 | 0.05 | 0.05 |
| Reaction Conditions | | | | | | |
| Temperature(°C.) | 55 | 55 | 55 | 55 | 55 | 55 |
| RPM | 600 | 600 | 600 | 600 | 600 | 600 |
| PH | 4.2 | 3.5 | 4.2 | 3.5 | 4.2 | 3.5 |
| Reaction time(hrs) | 7 | 8.3 | 7 | 9 | 6.6 | 6.9 |
| Conversion(wt %) | 84.6 | 84.4 | 81.3 | 77.8 | 84.4 | 74.4 |
| Test Results | | | | | | |
| Particle size(um) | | | | | | |
| 350 | 9.0 | 34.0 | 27.8 | 56.4 | 8.5 | 23.5 |
| 250 | 35.2 | 24.0 | 36.2 | 20.6 | 21.4 | 29.2 |
| 177 | 24.8 | 17.6 | 18.3 | 11.8 | 27.9 | 23.7 |
| 149 | 10.9 | 10.5 | 6.0 | 4.7 | 17.9 | 11.6 |
| 105 | 11.5 | 10.9 | 6.4 | 3.8 | 17.4 | 9.2 |
| <105 | 8.7 | 3.0 | 5.3 | 2.7 | 6.8 | 2.8 |
| Mean particle size(um) | 201 | 240 | 241 | 284 | 185 | 227 |
| Bulk density(g/cm3) | 0.428 | 0.536 | 0.456 | 0.491 | 0.367 | 0.378 |
| Plasticizer sorption (parts/100 g resin) | 106.6 | 76.1 | 90.8 | 77.0 | 115.6 | 107.2 |
| Funnel flow time (g/sec) | 4.3 | 7.9 | 5.5 | 7.3 | 5.3 | 7.4 |
| Degree of polymerization | 967 | 954 | 881 | 908 | 884 | 884 |
| Inherent viscosity | 0.96 | 0.95 | 0.90 | 0.92 | 0.91 | 0.90 |

TABLE 2-continued

| | Test No. | | | | | |
|---|---|---|---|---|---|---|
| | 1 | 2 | 3 | 4 | 5 | 6 |
| Polymer build-up(g) | 0.33 | 0.87 | 0.30 | 1.12 | 0.29 | 0.66 |

It was observed that the combination of the expanding lattice clay and the polyacrylic acid significantly improved the polymerization by reducing the polymerization time and the amount of polymer build-up on the surfaces of the polymerization reactor. Additionally, the particle size distribution and the funnel flow time were improved.

EXAMPLE 2

In this example, the procedure of Example 1 was followed with the exception that the protective colloid which was used was hydroxypropylmethyl cellulose which was used with and without Veegum. Table 3 sets out the results of the experiment.

TABLE 3

| | Run No. | |
|---|---|---|
| | 7 | 8 |
| Test Conditions | | |
| Vinyl chloride(wt %) | 100 | 100 |
| Water(wt %) | 200 | 200 |
| Hydroxypropylmethyl cellulose | 0.1 | 0.1 |
| Veegum(wt %) | — | 0.1 |
| Tween(wt %) | 0.05 | 0.05 |
| Di-2-ethyl hexyl peroxy dicarbonate(wt %) | 0.05 | 0.05 |
| Reaction conditions | | |
| Temperature(°C.) | 50 | 50 |
| RPM | 500 | 500 |
| PH | | 8.3 |
| Reaction time(hrs) | 12 | 9 |
| Conversion(wt %) | 66 | 69 |
| Test Results | | |
| Particle size(um) | | |
| 350 | 1.4 | 2.0 |
| 250 | 10.8 | 18.4 |
| 177 | 48.0 | 49.5 |
| 149 | 21.3 | 17.0 |
| 105 | 13.5 | 9.3 |
| <105 | 5.0 | 3.8 |
| Mean particle size(um) | 168 | 180 |
| Bulk density(g/cm$_3$) | 0.392 | 0.389 |
| Plasticizer sorption (parts/100 g resin) | 128.1 | 124.4 |
| Funnel flow time(g/sec) | 5.3 | 5.2 |
| Degree of polymerization | 1113 | 1237 |
| Inherent viscosity | 1.03 | 1.07 |

The presence of the expanding lattice clay with the hydroxypropylmethyl cellulose resulted in a significantly reduced polymerization time.

EXAMPLE 3

The procedure of Example 1 was again repeated with the substitution of polyvinyl alcohol with and without Veegum. The results are shown in the following table:

TABLE 4

| | Test No. | |
|---|---|---|
| | 9 | 10 |
| Test Conditions | | |
| Vinyl chloride(wt %) | 100 | 100 |
| Water(wt %) | 200 | 200 |
| Polyvinyl alcohol(wt %) | 0.13 | 0.13 |
| Veegum(wt %) | 0.13 | 0.09 |

TABLE 4-continued

| | Test No. | |
|---|---|---|
| | 9 | 10 |
| Di-2-ethyl hexyl peroxy dicarbonate(wt %) | 0.038 | 0.05 |
| Reaction conditions | | |
| Temperature(°C.) | 55 | 55 |
| RPM | 600 | 500 |
| PH | 8.5 | 4.7 |
| Reaction times(hrs) | 8 | 6.3 |
| Conversion(wt %) | 71 | 86.1 |
| Test Results | | |
| Particle size(um) | | |
| 350 | 6.0 | 29.7 |
| 250 | 29.1 | 37.5 |
| 177 | 32.7 | 14.6 |
| 149 | 15.3 | 5.0 |
| 105 | 9.7 | 3.7 |
| <105 | 7.3 | 9.6 |
| Mean particle size(um) | 192 | 245 |
| Bulk density(g/cm$_3$) | 0.377 | 0.439 |
| Plasticizer sorption (parts/100 g resin) | 126.5 | 101.7 |
| Funnel flow time(g/sec) | 5.0 | 5.3 |

The results evidence that the presence of the expanding lattice clay with the hydroxypropylmethyl cellulose increased the bell-shaped pattern of distribution of the particles. This was shown in the particle size distribution and in the mean particle size results.

The use of the protective colloid of this invention in the polymerization of vinyl chloride significantly improves the polymerization. In most instances, the polymerization time is significantly reduced. In all cases, the presence of the protective colloid enhanced the bell-shaped distribution of the polymer particles and significantly increased the particle size of the polymer. In the first experiment in which the build-up of solids on the reactor equipment was monitored, it was observed that the protective colloid significantly reduced the amount of polymer accumulation on the surfaces of the reactor and equipment, thereby further enhancing the polymerization by reducing the amount of down time and cleanup required for the polymerization cycles.

The invention has been described with reference to the illustrated and preferred embodiment. It is not intended that the description of the preferred embodiment and the preceding examples should unduly limit the invention. Instead, it is intended that the invention be defined by the method steps and reagents and their obvious equivalents, set forth in the following claims.

We claim:

1. In the method for the suspension polymerization of vinyl chloride wherein vinyl chloride monomer, initiator, and suspending agent are suspended in an aqueous medium, the improvement in polymerization which comprises: including in the suspension during polymerization an amount sufficient to maintain said suspension of the suspension agents of:

a. an expanding lattice magnesium aluminum silicate clay; and
   b. a hydrophilic polymer selected from the group consisting of: polyacrylic acid, polyvinyl alcohol, carboxyalkyl cellulose esters, and mixtures thereof; wherein said clay is smectite.

2. The method of claim 1 wherein said clay and hydrophilic polymer are blended together to form a complex prior to being incorporated in said polymerization zone.

3. The method of claim 1 wherein said clay has the empirical composition of:
   a. silicon dioxide from 56.9–69.0%;
   b. magnesium oxide from 2.9–13.0%;
   c. aluminum oxide from 8.9–17.0%;
   d. ferric oxide from 0.7–1.8%;
   e. calcium oxide from 1.1–2.0%;
   f. sodium oxide from 2.1–3.8%; and
   g. potassium oxide from 0.2–1.0%.

4. The method of claim 1 wherein said hydrophilic polymer is polyacrylic acid.

5. The method of claim 4 wherein said polyacrylic acid is cross-linked.

6. The method of claim 1 wherein said polymerization is performed at a temperature from 30° to 60° C.

7. The method of claim 1 in which said initiator is di-2(ethylhexyl)peroxydicarbonate.

8. In the method for the suspension polymerization of vinyl chloride wherein vinyl chloride monomer, initiator, and emulsifier are suspended in an aqueous medium, the improvement in polymerization which comprises: including in the suspension during polymerization, in an amount sufficient to maintain said suspension and prevent coalescence of the polymer, the following:
   a. a colloidal magnesium aluminum silicate obtained from smectite clays and having a chemical composition of:
      (1) silicon dioxide from 56.9–69.0%;
      (2) magnesium oxide from 2.9–13.0%;
      (3) aluminum oxide from 8.9–17.0%;
      (4) ferric oxide from 0.7–1.8%;
      (5) calcium oxide from 1.1–2.0%;
      (6) sodium oxide from 2.1–3.8%; and
      (7) potassium oxide from 0.2–1.0%; and
   b. a hydrophilic polymer selected from the group consisting of: polyacrylic acid, polyvinyl alcohol, carboxyalkyl cellulose esters, and mixtures thereof.

9. The method of claim 8, wherein said clay is smectite.

10. The method of claim 8, wherein said hydrophilic polymer is polyacrylic acid.

11. The method of claim 10 wherein said polyacrylic acid is cross-linked.

12. The method of claim 8 wherein said polymerization is performed at a temperature from 30° to 60° C.

13. The method of claim 8 in which said initiator is di-2(ethylhexyl)peroxydicarbonate.

14. The method of claim 8 wherein said clay and hydrophilic polymer are blended together to form a complex prior to being incorporated in said polymerization zone.

* * * * *